3,138,617
PROCESSES FOR THE PRODUCTION OF 19-NOR-Δ⁴-[9β],[10α]-ANDROSTENES AND INTERMEDIATES
Gerard Nomine and Andre Pierdet, Noisy-le-Sec, Robert Bucourt, Villiers le Bel, and Jean Tessier, Paris, France, assignors, by mesne assignments, to Roussel-UCLAF S.A., Paris, France, a corporation of France
No Drawing. Filed May 22, 1961, Ser. No. 111,499
Claims priority, application France Aug. 27, 1959
15 Claims. (Cl. 260—345.2)

The present invention relates to new 19-nor-steroids, and in particular to 19-nor-Δ⁴-[9β],[10α]-androsten-17β-ol-3-one and its esters, to the preparation of the said 19-nor-steroids and to the intermediate compounds utilized in the synthesis of said 19-nor-steroids and in particular to 3-alkoxy-3-methyl-4-oxa-19-nor-Δ⁵⁽¹⁰⁾-[9β]-androsten-17β-ol and its esters.

More particularly it relates to 19-nor-steroids of the Formula III:

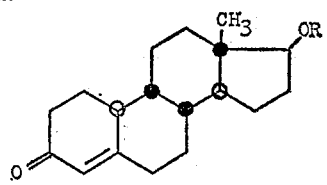

III wherein R represents hydrogen, a lower alkyl radical and the acyl radical of an organic carboxylic acid having one to eighteen carbon atoms. These compounds are epimeric in the 9 and 10 positions with products of the natural series. Of particular interest is 19-nor-Δ⁴-[9β],-[10α]-androsten-17β-ol-3-one and its organic acid esters.

It is an object of the present invention to prepare new 19-nor-steroids of the formula:

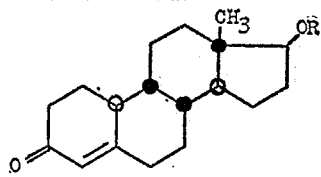

wherein R represents a radical selected from the group consisting of hydrogen, lower alkyl and the acyl radical of an organic carboxylic acid having from one to eighteen carbon atoms.

It is a further object of the invention to develop processes for the preparation of the new 19-nor-steroids.

Another object of the invention is the preparation of the intermediate oxa steroids of the formula:

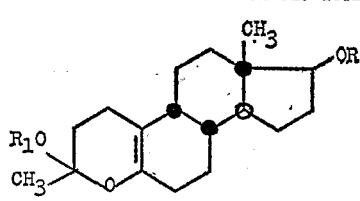

wherein R represents a radical selected from the group consisting of hydrogen, lower alkyl and the acyl radical of an organic carboxylic acid having from one to eighteen carbon atoms and R₁ represents a lower alkyl group.

These and other objects of the invention will become more apparent as the description thereof proceeds.

We have found that 19-nor-steroids of the Formula III:

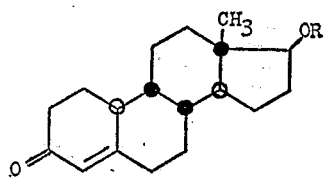

III wherein R represents hydrogen, a lower alkyl radical and the acyl radical of an organic carboxylic acid having one to eighteen carbon atoms, can be produced starting from compounds of the Formula I:

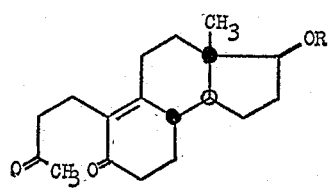

I wherein R has the above-assigned meanings by catalytic hydrogenation in the presence of a lower alkanol to give compounds of the Formula II:

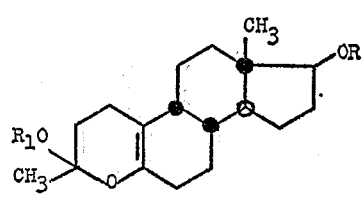

II wherein R has the above-assigned meaning and R₁ represents a lower alkyl group. These latter compounds are subject to the action of a strong mineral acid in the presence of an organic solvent to produce the 19-nor-steroids of Formula III.

19-nor-steroids of Formula III can also be produced by cyclizing compounds of the Formula IA:

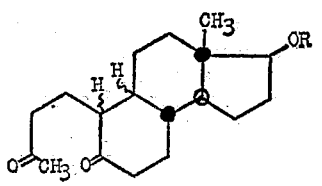

IA wherein R has the above-assigned meaning, at elevated temperatures with the aid of an alkaline dehydrating agent and separating 19-nor-steroids of Formula III from the 19-nor-testosterones, also produced, by chromatography. The production of 19-nor-testosterones by this process is the subject matter of U.S. patent application S.N. 36,172, filed June 15, 1960, now abandoned. This application is a continuation-in-part of said S.N. 36,172.

The present invention with reference to the preparation of oxa steroids of Formula II, is based in particular on the unexpected observation that hydrogenation of compounds of the partial formula:

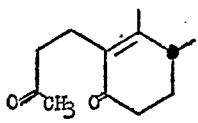

in an hydroxylated solvent such as a lower alkanol leads to a pyranic compound of the partial formula:

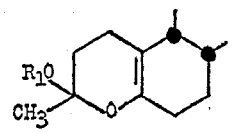

in which $R_1$ represents the lower alkyl radical of the hydroxylated solvent utilized and where the hydrogen added on the 9 carbon atom is in the desired orientation.

The process of preparation of oxa steroids of Formula II is essentially characterized in that a $\Delta^{8(9)}$-3-methyl-7-oxo-8-(3' - oxobutyl) - 3,4 - [3'-hydroxy-cyclopentano-(2', 1')]-octahydronaphthalene, whose hydroxyl group in the 3' position may be free or blocked, is hydrogenated in the presence of a catalyst such as palladized carbon black in solution in an hydroxylated solvent, such as a lower alkanol, in an acidic media and a 4-oxa-[9β]-19-nor-steroid, of Formula II is isolated.

The solvent in which the hydrogenation is effected is preferentially ethanol, which leads to a compound of Formula II ethoxylated in the 3 position ($R_1=C_2H_5$). The media is, of preference, weakly acidic and the proper degree of acidity can be obtained by use of a catalyst prepared in an acidic media then washed with water. The small amount of acid which this catalyst retains despite the washing suffices to adjust the pH of the hydrogenation solution to between 4 and 5.

The preparation of the starting racemic or optically active $\Delta^{8(9)}$-3-methyl-7-oxo-8-(3'-oxobutyl)-3,4-[3'-acyloxy-cyclopentano-(2',1')] - octahydronaphthalene compounds of the Formula I:

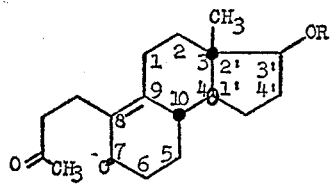

wherein R represents a member selected from the group consisting of hydrogen, lower alkyl and the acyl radical of an organic carboxylic acid having from 1 to 18 carbon atoms is described in the copending, commonly-assigned U.S. patent No. 3,019,252.

Among the starting compounds it is preferable to use one whose hydroxyl in the 3' position is blocked either in the form of an easily crystallizable ester, such as the benzoate, hexahydrobenzoate, halobenzoates, nitrobenzoates, naphthoate, phthalates, pivalate, cycloalkylacetates, etc. or in the form of an ether such as the ethyl, dihydro or tetrahydropyranyl ethers.

The process of the invention is advantageously executed by using as the starting compound $\Delta^{8(9)}$-3-methyl-7-oxo-8 - (3' - oxobutyl) - 3,4 - [3' - benzyloxy - cyclopentano-(2', 1')]-octahydronaphthalene (compound I wherein $Ac=C_6H_5CO$). However, other esters of organic carboxylic acids having from 1 to 18 carbon atoms, such as the alkanoates and alkenoates, for example, the acetate, the trimethylacetate, the propionate, the 4,4-dimethyl-pentanoate, the 10-undecenoate; the cycloalkyl-alkanoates, for example, the β-cyclopentyl-propionate; the arylalkanoates, for example, the phenyl-propionate; the the cycloalkanoates, for example, the hexahydrobenzoate, the hexahydroterephthalate and other phenyl-carboxylic acids may also be used without departing from the scope of the invention.

In the case where the obtention of the pyranic compound II in the form of the free alcohol is desired, it is possible to start from non-esterified compound I. However, it is much more advantageous to form the pyranic compound II whose hydroxyl is blocked and to subsequently saponify it. The yields are superior since the pyranic ring is resistant to the alkaline attack.

The invention extends, as has already been indicated, to the process of using the oxa steroids in the synthesis of 19-nor-steroids, epimeric in the 9 and 10 positions, with the products of the natural series by the action of a strong mineral acid on said oxa steroids.

The action of a strong mineral acid on the pyranic compounds of Formula II opens the pyranic ring with subsequent aldolization and simultaneous dehydration to give a ring with a ketone function in the 3 position and a double bond in the 4, 5 position.

In order to cyclize the pyranic compounds of Formula II, hydrochloric acid is advantageously utilized. The reaction is conducted preferentially in the presence of an oxygenated organic polar solvent such as dioxane or acetic acid. It is best to maintain the reaction temperature constant and below 25° C.

One method of advantageous execution, if the compound of Formula II is esterified, consists in saponifying the pyranic compound II and thereafter cyclizing it.

According to another mode of execution, it is also possible to cyclize a pyranic compound II, whose hydroxyl in the 17 position is blocked, into the 19-nor-steroid and, thereafter, to proceed to the saponification step in order to obtain a 19-nor-steroid of Formula III having a 17-hydroxyl group.

After saponification of the 19-nor-steroids thus obtained, they are obviously easily re-esterified by all esterifying derivatives of organic or mineral acids.

The invention includes also the different esters of 19-nor-[9β],[10α]-steroids, obtained by the present process. These compounds have an interesting pharmacodynamic activity and possess particularly an antihypophysial or anabolising action.

Table I represents a flow diagram of the above reaction.

TABLE I

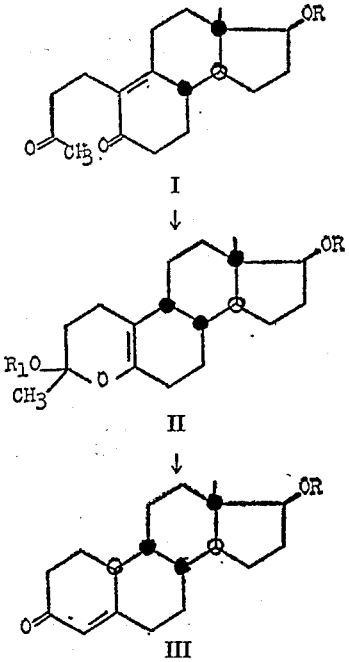

R and $R_1$ have the above-assigned meanings.

As disclosed above, another method of obtaining 19-nor-[9β],[10α]-steroids of Formula III is the isolation of these compounds as secondary products in the cyclization of 3-methyl-7-oxo-8-(3'-oxobutyl)-3,4-[3'-acyloxy-cyclopentano-(2',1')]-decahydronaphthalene compounds of Formula IA at elevated temperatures with the aid of alkaline dehydrating agents such as alkali metal lower alkanolates at elevated temperatures in the presence of a lower alkanol corresponding to the alkanolate used. After isolation of the 19-nor-testosterones as taught in S.N. 36,172 by chromatography over silica gel with elution with methylene chloride containing increasing amounts of acetone up to 6% acetone, the desired 19-nor-[9$\beta$], [10$\alpha$]-steroids of Formula III are isolated by further elution with methylene chloride containing 6% acetone. The raw product thus obtained is purified by fractional recrystallization.

The following examples, which are given purely for illustration, are non-limitative in character and will make the invention better understood to one skilled in the art.

The melting points are instantaneous melting points determined on a Maquenne block. The temperatures are given in degrees centigrade.

*Example I.—Preparation of 3-Ethoxy-3-Methyl-4-Oxa-19-Nor - $\Delta^{5(10)}$ - [9$\beta$] - Androsten - 17$\beta$ - Ol (Compound II; R=H and $R_1=C_2H_5$)*

STEP A.—PREPARATION OF 3-ETHOXY-3-METHYL-17$\beta$-BENZOYLOXY-4-OXA-19-NOR-$\Delta^{5(10)}$-[9$\beta$] - ANDROSTENE (COMPOUND II; R=C$_6$H$_5$CO AND $R_1$=C$_2$H$_5$).

0.68 gram of activated carbon, 68 cc. of ethanol and 0.34 cc. of an aqueous hydrochloric acid solution containing 33% palladium chloride were agitated under hydrogen for a period of 30 minutes. The catalyst, so prepared, was vacuum filtered and washed with water. It was then washed with ethanol and placed in suspension in 270 cc. of ethanol in which 3 grams of $\Delta^{8(9)}$-3-methyl - 7 - oxo - 8 - (3' - oxobutyl) - 3,4 - [3' - benzoyloxy - cyclopentano - (2',1')] - octahydronaphthalene (I) had previously been dissolved. The mixture was agitated in an atmosphere of hydrogen for a period of 28 hours at 20°. The catalyst was next separated by decantation of the mother liquors and subjected to four successive extractions, each time with 20 cc. aliquots of boiling ethanol. The alcoholic extracts were combined and added to the mother liquor. The liquors were concentrated to 30-35 cc. by distillation under vacuum. Thereafter, the liquors were cooled to 0° C. and the precipitate was recovered which was vacuum filtered and washed with ethanol. 1.6 grams of 3-ethoxy-3-methyl-17$\beta$ - benzoyloxy - 4 - oxa - 19 - nor - $\Delta^{5(10)}$ - [9$\beta$] - androstene (Compound II; R=C$_6$H$_5$CO and $R_1$=C$_2$H$_5$) were obtained.

It was possible to obtain another fraction of this compound by treatment of the mother liquors with T reagent. A total yield of 1.73 grams, being 52% of theoretical, of a compound having a melting point of 190° C. and a specific rotation $[\alpha]_D^{20}$=+36° (c.=0.5% in benzene) was obtained.

The product occurs in the form of colorless needles, is slightly soluble in most organic solvents and insoluble in water.

*Analysis.*—C$_{27}$H$_{36}$O$_4$; molecular weight=424.55. Calculated: C, 76.38%; H, 8.54%. Found: C, 76.4%; H, 8.6%.

Ultraviolet spectra (ethanol):

$\lambda$ max. at 229 m$\mu$, $\epsilon$=13 800
$\lambda$ max. at 273 m$\mu$, $\epsilon$=280

Infra-red spectra (carbon di-sulfide):

Band at 5.94$\mu$

This product has not been described in the literature.

The starting compound, Compound I, is prepared according to the process described in U.S. Patent No. 3,019,252.

STEP B.—PREPARATION OF 3-ETHOXY-3-METHYL-4-OXA - 19 - NOR - $\Delta^{5(10)}$ - [9$\beta$] - ANDROSTEN - 17$\beta$ - OL (COMPOUND II; R=H AND $R_1$=C$_2$H$_5$).

1.86 grams of 3-methyl-3-ethoxy-17$\beta$-benzoyloxy-4-oxa-19 - nor - $\Delta^{5(10)}$ - [9$\beta$] - androstene (Compound II where R=C$_6$H$_5$CO and $R_1$=C$_2$H$_5$) were heated to reflux for a period of an hour and a half in 186 cc. of 1 N alcoholic potassium hydroxide containing 10% water. The mixture was then concentrated to a volume of 30-40 cc. by heating under vacuum, then diluted with 300 to 400 cc. of water and the precipitate formed was filtered. This precipitate was vacuum filtered and washed with water. 1.31 grams of 3-methyl-3-ethoxy-4-oxa-19-nor-$\Delta^{5(10)}$-[9$\beta$]-androsten-17$\beta$-ol (Compound II where R=H, $R_1$=C$_2$H$_5$) was thus obtained, being a yield of 94%. Melting point: 141° C.

On recrystallization from isopropyl ether, the melting point was raised to 142° C. and the specific rotation was $[\alpha]_D^{20}$=−43.3° (c.=0.5% in benzene).

Application of 3 - alkoxy - 3 - methyl - 4 - oxa-19-nor-$\Delta^{5(10)}$-[9$\beta$]-androsten-17$\beta$-ol whose hydroxyl group in the 17 position is free or blocked, of Formula II, to the preparation of 19-nor-steroids having an inverse configuration in the 9 and 10 positions is shown as follows:

*Example II.—Preparation of 19-Nor-$\Delta^4$-[9$\beta$],[10$\alpha$]-Androsten-17$\beta$-Ol-3-One (Compound III, R=H)*

0.4 gram of 3 - ethoxy - 3 - methyl-4-oxa-19-nor-$\Delta^{5(10)}$-[9$\beta$]-androsten-17$\beta$-ol (compound II, R=H, $R_1$=C$_2$H$_5$), then 8 cc. of anhydrous dioxane were introduced successively into a balloon flask having nitrogen bubbling therethrough. The balloon flask was then plunged into a mixture of water and ice and while under agitation, 0.48 cc. of concentrated hydrochloric acid was added drop by drop.

The reaction mixture was allowed to stand for a period of 15 hours under an atmosphere of nitrogen while maintaining the temperature at 20° C. The reaction mixture was then poured into 80 cc. of 7% sodium carbonate solution. A white crystalline precipitate appeared which was separated by filtration, vacuum filtered, washed until neutral with water and then dried under vacuum over phosphoric acid.

0.320 gm. of 19-nor-$\Delta^4$-[9$\beta$],[10$\alpha$]-androsten-17$\beta$-ol-3-one (compound III, R=H) were obtained, being a yield of 94%. The raw product which was obtained melted at 212° C.

By recrystallization from hot acetone after cooling there was obtained 0.222 gram of a compound which crystallized in small prismatic rods and melted at 222–223° C.

The compound was very soluble in chloroform, soluble in ether, slightly soluble in acetone and insoluble in water.

Infra-red spectra (in chloroform):

Shows presence of bands characteristic of hydroxyl groups and 3-keto-$\Delta^4$-conjugated ketones.

*Example III.—Preparation of 19-Nor-$\Delta^4$-[9$\beta$],[10$\alpha$]-Androsten-17$\beta$-Ol-3-One by the Intermediate 17-Benzoate Ester*

0.415 gram of 3-ethoxy-3-methyl-17$\beta$-benzoyloxy-4-oxa - 9 - nor - $\Delta^{5(10)}$ - [9$\beta$]-androstene (II, R=C$_6$H$_5$CO, $R_1$=C$_2$H$_5$) were dissolved in 8.3 cc. of acetic acid under an atmosphere of nitrogen, 0.6 cc. of concentrated hydrochloric acid were added and the reaction mixture was allowed to stand for a period of 20 hours at a temperature of 20° C. 40 cc. of a 5% sodium carbonate solution was then added to the reaction mixture which was agitated. The precipitated product was then extracted with ether. The ethereal phases were decanted, combined, washed with water, dried and evaporated to dryness under vacuum. After recrystallization from ether 0.30 gram (being 80%) of 17β-benzoyloxy-9-nor-Δ⁴-[9β],[10α]-androsten-3-one (compound III;

R=C₆H₅CO)

was obtained having a melting point of 160° C. and a specific rotation [α]$_D^{20}$=+2° (c.=0.5% in methanol).

The product had the form of prismatic colorless needles, was soluble in most of the usual organic solvents and particularly in methanol and ethanol.

*Analysis.*—C₂₅H₃₀O₃; molecular weight=378.5. Calculated: C, 79.32%; H, 7.99%. Found: C, 79.2%; H, 7.9%.

The infrared spectra confirmed the presence of a band corresponding to an ethenically conjugated ketone, similar to that of 19-nor-steroids possessing the ketonic system conjugated in the 3-4 position. The measure of the rotatory dispersion gave a curve antipodial to that of 19-nor-testosterone.

The compound is not described in the literature.

Saponification of the hereabove product by an alkaline agent furnished 19-nor-Δ⁴-[9β],[10α]-androsten-17β-ol-3-one, melting at 223° C. (compound III, R=H) identical to the product described in Example II.

*Example IV.*—*Preparation of 19-Nor-Δ⁴-[9β],[10α]-Androsten-17β-Ol-3-One (III; R=H) by Cyclization of 3 - Methyl - 7 - Oxo - 8 - (3' - Oxobutyl) - 3,4 - [3' - Benzoyloxy - Cyclopentano - (2',1')] - Decahydronaphthalene*

1 gram of 3 - methyl - 7-oxo - 8-(3'-oxobutyl)-3,4-[3'-benzoyloxy - cyclopentano - (2',1')] - decahydronaphthalene (IA, R=C₆H₅CO) was dissolved in 15 cc. of methanol under an atmosphere of nitrogen. Compound IA was obtained by hydrogenation of Δ⁸⁽⁹⁾-3-methyl-7-oxo - 8 - (3' - oxobutyl) - 3,4 - [3' - benzoyloxy - cyclopentano-(2',1')]-octahydronaphthalene (I, R=C₆H₅CO), melting point 117° C., specific rotation [α]$_D^{20}$=+43° (c.=1% in methanol), according to the process described in U.S. patent application S.N. 36,172.

To the methanolic solution of the starting compound there were added 26.2 cc. of a 1 N methanolic potassium hydroxide solution and the reaction mixture was heated to reflux under nitrogen for a period of 2 hours. The reaction mixture was then evaporated to dryness under vacuum, added to water and extracted with ether. The ether extracts were combined, washed with water, dried over sodium sulfate, filtered and then evaporated to dryness under vacuum. 0.500 gram of a yellow resin was obtained which was subjected to chromatography over silica gel (40 grams) with elution, first with pure methylene chloride, then with methylene chloride containing an increasing percentage of acetone. The elution was effected by fractions of 40 cc. of solvent. The first nine fractions with methylene chloride containing 6% acetone furnished 19 - nor-testosterone. The following fourteen elution fractions with methylene chloride containing 6% acetone gave, after evaporation of solvent, 450 mg. of the 9β,10α-epimer of 19-nor-testosterone. These last fractions were chromatographed a second time under the same conditions but by fractions of 30 cc. of solvent. The elution fractions with methylene chloride containing 6% acetone were isolated and evaporated to dryness. The residue crystallized spontaneously and the desired 10α - isomer, 19 - nor - Δ⁴-[9β],[10α]-androsten-17β-ol-3-one (III; R=H) was recovered and purified by recrystallization from hot acetone. The product obtained melted at 223° C. and had a specific rotation [α]$_D^{20}$=−86.3° (c.=1% in ethanol).

The product was very soluble in chloroform, soluble in benzene, acetone, alcohol and ethyl ether, slightly soluble in isopropyl ether and insoluble in water and in dilute aqueous alkalis.

*Analysis.*—C₁₈H₂₆O₂; molecular weight=274.4. Calculated: C, 78.79%; H, 9.55%. Found: C, 79.0%; H, 9.7%.

Ultraviolet spectra (in ethanol):

$\lambda_{max.}$ at 242 mμ, ε=16 200

This product is not described in the literature.

It will be understood that the invention is not limited to the specific modes of execution described above. Particularly, it is evident to one skilled in the art that equivalent techniques may be employed, such as varying the temperatures, the nature of the solvents, or the ester of the organic carboxylic acid and the lower alkanol solvent, without departing from the spirit of the invention or the scope of the appended claims.

We claim:
1. An oxa-steroid of the formula:

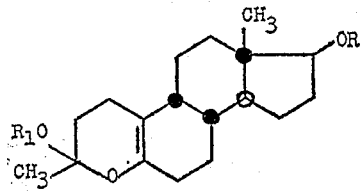

wherein R is selected from the group consisting of hydrogen, lower alkyl, dihydropyranyl, tetrahydropyranyl and the acyl radical of an organic carboxylic acid having from one to eighteen carbon atoms selected from the group consisting of alkanoic acids, alkenoic acids, cycloalkyl-alkanoic acids, phenylalkanoic acids, cycloalkanoic acids, phenylcarboxylic acids, halophenylcarboxylic acids, nitrophenylcarboxylic acids and naphthoic acid and R₁ represents lower alkyl.

2. 3-ethoxy - 3 - methyl-17β-benzoyloxy-4-oxa-19-nor-Δ⁵⁽¹⁰⁾-[9β]-androstene.

3. 3-ethoxy - 3 - methyl - 4 - oxa - 19 - nor-Δ⁵⁽¹⁰⁾-[9β]-androsten-17β-ol.

4. The process for the preparation of oxa-steroids of the formula:

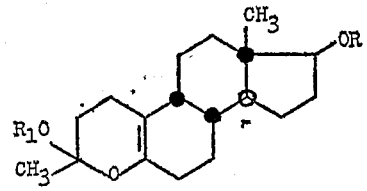

wherein R represents a radical selected from the group consisting of hydrogen, lower alkyl, dihydropyranyl, tetrahydropyranyl and the acyl radical of an organic carboxylic acid having from one to eighteen carbon atoms selected from the group consisting of alkanoic acids, alkenoic acids, cycloalkyl-alkanoic acids, phenylalkanoic acids, cycloalkanoic acids, phenylcarboxylic acids, halophenylcarboxylic acids, nitrophenylcarboxylic acids and naphthoic acid and R₁ represents a lower alkyl group, which comprises the steps of hydrogenating a compound of the formula:

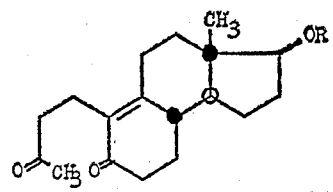

wherein R has the above-assigned meanings in the presence of a catalyst and a lower alkanol solvent in an acidic media and recovering said oxa steroid.

5. The process of claim 4 wherein said lower alkanol solvent is ethanol.

6. The process of claim 4 wherein said catalyst is palladized carbon black prepared in an acidic media.

7. The process of claim 4 wherein the pH of said acidic media is between 4 and 5.

8. The process of producing 3-ethoxy-3-methyl-4-oxa-19-nor-$\Delta^{5(10)}$-[9β]-androsten-17β-ol which comprises the steps of hydrogenating $\Delta^{8(9)}$-3-methyl-7-oxo-8-(3'-oxobutyl)-3,4-[3'-benzoyloxy-cyclopentano-(2',1')]-octahydronaphthalene in the presence of a palladized carbon black catalyst and ethanol at a pH between about 4 to about 5, saponifying the 3-ethoxy-3-methyl-17β-benzoyloxy-4-oxa-19-nor-$\Delta^{5(10)}$-[9β]-androstene by the action of an alkali metal hydroxide and recovering said 3-ethoxy-3-methyl-4-oxa-19-nor-$\Delta^{5(10)}$-[9β]-androsten-17β-ol.

9. The process of producing 19-nor-steroids of the formula:

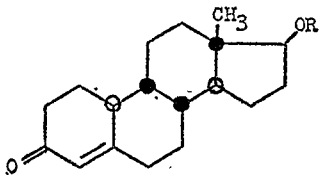

wherein R represents a radical selected from the group consisting of hydrogen, lower alkyl, dihydropyranyl, tetrahydropyranyl and the acyl radical of an organic carboxylic acid having from one to eighteen carbon atoms selected from the group consisting of alkanoic acids, alkenoic acids, cyclo-alkyl-alkanoic acids, phenylalkanoic acids, cycloalkanoic acids, phenylcarboxylic acids, halophenylcarboxylic acids, nitrophenylcarboxylic acids and naphthoic acid which comprises the steps of hydrogenating a compound of the formula:

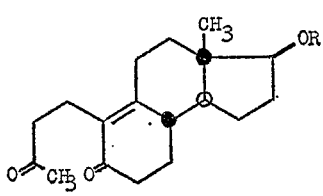

wherein R has the above-assigned meanings in the presence of a catalyst and a lower alkanol solvent in an acidic media, cyclizing the oxa-steroids of the formula:

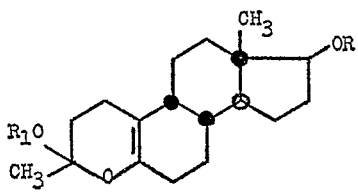

wherein R has the above-assigned meanings and $R_1$ represents a lower alkyl group, by the action of a strong mineral acid and recovering said 19-nor-steroids.

10. The process of claim 9 wherein said strong mineral acid is a concentrated aqueous solution of hydrochloric acid.

11. The process of claim 9 wherein said cyclization is effected in the presence of an oxygenated organic polar solvent.

12. The process of claim 9 wherein the cyclization is effected at a constant temperature below 25° C.

13. The process of producing 19-nor-$\Delta^4$-[9β],[10α]-androsten-17β-ol-3-one which comprises the steps of hydrogenating $\Delta^{8(9)}$-3-methyl-7-oxo-8-(3'-oxobutyl)-3,4-[3'-benzoyloxy-cyclopentano-(2',1')]-octahydronaphthalene in the presence of a palladized carbon black catalyst and ethanol at a pH between about 4 to about 5, saponifying the 3-ethoxy-3-methyl-17β-benzoyloxy-4-oxa-19-nor-$\Delta^{5(10)}$-[9β]-androstene by the action of an alkali metal hydroxide, cyclizing the 3-ethoxy-3-methyl-4-oxa-19-nor-$\Delta^{5(10)}$-[9β]-androsten-17β-ol by the action of hydrochloric acid in the presence of a polar oxygenated organic solvent at a temperature held constant at about 20° C. and recovering said 19-nor-$\Delta^4$-[9β],[10α]-androsten-17β-ol-3-one.

14. The process of producing 19-nor-$\Delta^4$-[9β],[10α]-androsten-17β-ol-3-one which comprises the steps of reacting a 3-methyl-7-oxo-8-(3'-oxobutyl)-3,4-[3'-acyloxy-cyclopentano-(2',1')]-decahydronaphthalene compound of the formula:

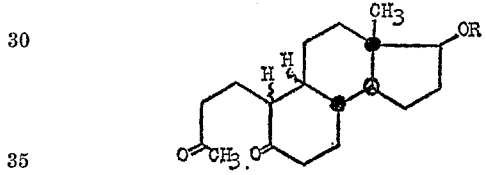

wherein R represents a radical selected from the group consisting of hydrogen, lower alkyl, dihydropyranyl, tetrahydropyranyl and the acyl radical of an organic carboxylic acid having from one to eighteen carbon atoms selected from the group consisting of alkanoic acids, alkenoic acids, cyclo-alkyl-alkanoic acids, phenylalkanoic acids, cycloalkanoic acids, phenylcarboxylic acids, halophenylcarboxylic acids, nitrophenylcarboxylic acids and naphthoic acid with an alkali metal lower alkanolate, separating 19-nor-testosterone by chromatography, and recovering said 19-nor-$\Delta^4$-[9β],[10α]-androsten-17β-ol-3-one.

15. The process of claim 14 wherein said 19-nor-testosterone is separated by chromatography over silica gel with elution with methylene chloride containing increasing amounts of acetone up to 6% and the 19-nor-$\Delta^4$-[9β],[10α]-androsten-17β-ol-3-one is recovered from said silica gel by elution with methylene chloride containing 6% acetone.

References Cited in the file of this patent
UNITED STATES PATENTS
2,756,244   Djerassi et al. _____ July 24, 1956